United States Patent
Liang et al.

(10) Patent No.: US 12,306,732 B2
(45) Date of Patent: May 20, 2025

(54) TRACE BUFFER DATA MANAGEMENT FOR EMULATION SYSTEMS

(71) Applicant: Synopsys, Inc., Mountain View, CA (US)

(72) Inventors: Chia-Wei Liang, Saratoga, CA (US); Wenxin Wang, Sunnyvale, CA (US); Meng-Tse Chen, Zhubei (TW); Goichiro Ono, San Jose, CA (US); Zhe Zhao, Shanghai (CN); Yang Song, Santa Clara, CA (US); Yu Sui, Sunnyvale, CA (US); Yuchen Xu, San Jose, CA (US)

(73) Assignee: Synopsys, Inc., Sunnyvale, CA (US)

( * ) Notice: Subject to any disclaimer, the term of this patent is extended or adjusted under 35 U.S.C. 154(b) by 52 days.

(21) Appl. No.: 17/903,925

(22) Filed: Sep. 6, 2022

(65) Prior Publication Data

US 2023/0074456 A1    Mar. 9, 2023

Related U.S. Application Data

(60) Provisional application No. 63/241,301, filed on Sep. 7, 2021.

(51) Int. Cl.
*G06F 11/22* (2006.01)
*G06F 11/273* (2006.01)

(52) U.S. Cl.
CPC ........ *G06F 11/273* (2013.01); *G06F 11/2289* (2013.01)

(58) Field of Classification Search
CPC ............. G06F 11/273; G06F 11/2733; G06F 11/2736; G06F 11/277; G06F 30/33; G06F 30/331
See application file for complete search history.

(56) References Cited

U.S. PATENT DOCUMENTS

| | | | | |
|---|---|---|---|---|
| 5,778,430 | A * | 7/1998 | Ish | G06F 12/123 711/E12.071 |
| 6,065,018 | A * | 5/2000 | Beier | G06F 11/1402 707/610 |
| 10,068,040 | B2 * | 9/2018 | Chen | G06F 30/33 |
| 2007/0043548 | A1 * | 2/2007 | Arevalo | G06F 30/33 703/14 |
| 2008/0168103 | A1 * | 7/2008 | Rakic | G06F 12/123 |
| 2009/0177844 | A1 * | 7/2009 | Naylor | G06F 12/122 711/136 |

(Continued)

*Primary Examiner* — Joseph O Schell
(74) *Attorney, Agent, or Firm* — Fenwick & West LLP

(57) ABSTRACT

An emulation system traverses trace buffers to read data captured from a design under test (DUT). The emulation system receives a request to read at least a portion of DUT data. The emulation system reads a header of the latest sample of the DUT data, where header of each sample of the DUT data includes one or more pointers to a previously stored sample. The samples of the DUT data are partitioned into frames and sectors. The emulation system can identify samples of the DUT data using the pointers in the header of the samples and compare time stamps of the samples against a specified time stamp in the received request. After identifying a sample having the specified time stamp, the emulation system may read the sample for output to the user (e.g., reconstructing a waveform using the sample).

18 Claims, 5 Drawing Sheets

(56) References Cited

U.S. PATENT DOCUMENTS

| | | | |
|---|---|---|---|
| 2014/0244935 A1* | 8/2014 | Ezra | G06F 3/0614 |
| | | | 711/133 |
| 2020/0073866 A1* | 3/2020 | Joyner | G06F 16/212 |
| 2020/0327027 A1* | 10/2020 | Mittal | G06F 11/2733 |
| 2021/0304120 A1* | 9/2021 | Hill | G06F 16/27 |
| 2022/0121542 A1* | 4/2022 | Khare | G06F 11/2268 |

* cited by examiner

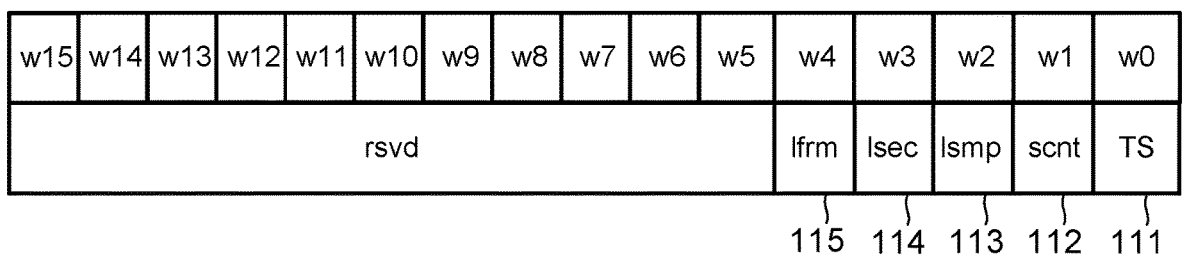
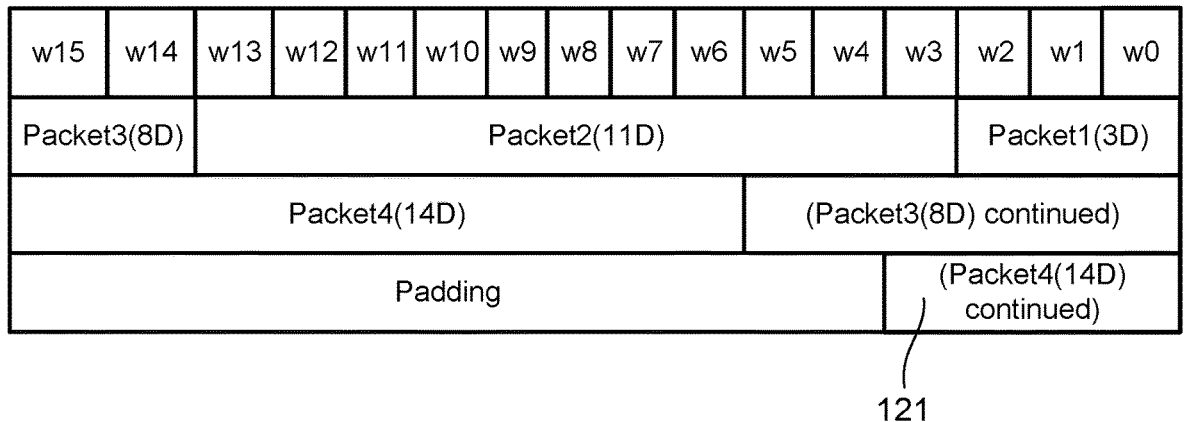
FIG. 1

200

| | Start of sample 0.0 | | | | |
|---|---|---|---|---|---|
| rsvd | lfrm | lsec | lsmp | scnt | TS |
| D | D | D | D | D | D |
| D | D | D | D | D | D |
| | Start of sample 0.1 | | | | |
| rsvd | lfrm | lsec | lsmp | scnt | TS |
| D | D | D | D | D | D |
| | Start of sample 0.127 | | | | |
| rsvd | lfrm | lsec | lsmp | scnt | TS |
| D | D | D | D | D | D |
| D | D | D | D | D | D |
| | Start of sample 1.0 | | | | |
| rsvd | lfrm | lsec | lsmp | scnt | TS |
| D | D | D | D | D | D |
| D | D | D | D | D | D |
| | Start of sample 2.0 | | | | |
| rsvd | lfrm | lsec | lsmp | scnt | TS |
| D | D | D | D | D | D |
| D | D | D | D | D | D |
| | Start of sample 63.0 | | | | |
| rsvd | lfrm | lsec | lsmp | scnt | TS |
| D | D | D | D | D | D |
| D | D | D | D | D | D |
| | Start of sample 63.126 | | | | |
| rsvd | lfrm | lsec | lsmp | scnt | TS |
| D | D | D | D | D | D |
| D | D | D | D | D | D |
| | Start of sample 63.127 | | | | |
| rsvd | lfrm | lsec | lsmp | scnt | TS |
| D | D | D | D | D | D |
| D | D | D | D | D | D |

FIG. 2

TRACE BUFFER DATA MANAGEMENT FOR EMULATION SYSTEMS

RELATED APPLICATION

This application claims the benefit of U.S. Provisional Application No. 63/241,301, filed Sep. 7, 2021, which is incorporated by reference in its entirety.

TECHNICAL FIELD

The present disclosure relates to emulation systems and in particular to a trace buffer for emulation systems.

BACKGROUND

Emulation and prototyping systems sample and store device under test (DUT) signal activity data. To traverse through stored data, conventional emulation systems may rely on a last header as a starting point when traversing sampled data. Conventional emulation systems traverse data one sample at a time from the latest sample's header. Because the emulation system may capture and store a large amount of DUT signal activity, this traversal can be both processing intensive and time consuming.

SUMMARY

An emulation system may read data captured from a design under test (DUT). The emulation system may receive a request for a read of at least a portion of DUT data. The request can include a specified time stamp (e.g., specified by a user). The emulation system can read a header of a latest sample of the DUT data. The header may have a previous frame header address. The emulation system may compare, for a first set of samples of the DUT data identified using the previous frame header address, the specified time stamp with a time stamp of each of the first set of samples until a compared time stamp of a sample of the first set of samples is earlier than the specified time stamp. A header of the sample of the first set of samples can have a previous sector header address. The emulation system can compare, for a second set of samples identified using the previous sector header address, the specified time stamp with a time stamp of each of the second set of samples until a compared time stamp of a sample of the second set of samples is earlier than the specified time stamp. A header of the sample of the second plurality of samples may have a previous sample header address. The emulation system can compare, for a third set of samples identified using the previous sample header address, the specified time stamp with a time stamp of each of the third set of samples until a compared time stamp of a sample of the third set of samples is equivalent to the specified time stamp. The emulation system may read the portion of the DUT data from the sample of the third plurality of samples.

In some embodiments, the latest sample of the DUT data is partitioned by a frame, and a previous frame header address corresponds to a sample of the DUT data that is partitioned by a different frame. In some embodiments, that sample is partitioned by a sector, and a previous sector header address corresponds to another sample of the DUT data that is partitioned by different sector. In some embodiments, the emulation system can identify the first set of samples by traversing addresses corresponding to the first set of samples starting from an address starting from the previous frame header address. The emulation system can identify the second set of samples by traversing addresses corresponding to the second set of samples starting from the previous sector header address.

The DUT data may be partitioned by frames, where each of the frames includes sectors that further partition the DUT data. Each frame may include a determined number of sectors (e.g., one frame may include sixty four sectors). The emulation system may reconstruct a waveform using the read portion of the DUT data from the sample of the third set of samples.

In some embodiments, an emulation system may read data captured from a DUT in an emulator by receiving a request for a read of at least a portion of the DUT data. The request can include a time stamp or a sample count. Data packets of the DUT data are stored in one or more partitions of a memory. There may be a header associated with a data packet, where the header indicates a corresponding partition used to store the data packet. The emulation system may read a first header associated with a first data packet of a last sample of the DUT data. The first header may include an identifier of a partition associated with a previous sample of the DUT data. The emulation system can identify, using the partition, a second header associated with a second data packet of the previous sample. The second header can include a time stamp of the previous sample and a sample count of the previous sample. The emulation system can compare one of the requested time stamp and the time stamp of the previous sample or the requested sample count with the sample count of the previous sample. The emulation system can read at least a data packet corresponding to the previous sample (e.g., in response to the comparison showing a matching time stamp or sample count).

In some embodiments, an emulation system captures DUT data by receiving a determined number of clock cycle intervals to sample internal state signals (e.g., a predetermined number as specified by a user). The emulation system may then receive the DUT data, which includes internal state signals and primary input signals. The emulation system can sample the primary input signals on each clock cycle and sample the internal state signals on every determined number of clock cycles. The emulation system may then create, on each clock cycle, a header for a current sample of the DUT data. The header may include a time stamp of the current sample, a sample count to the current sample, a last sample pointer, a last sector pointer, and a last frame pointer. The emulation system may store, with each clock cycle, the current header of the current sample of the DUT data with the time stamp. The emulation system can store the internal state signal at each interval corresponding to the determined number of clock cycle intervals.

The emulation system can store a portion of the DUT data in a memory and align the stored portion of the DUT data with a memory data word size. The emulation system can pad the portion of the DUT data in response to a data or a header size (e.g., of a sample of the DUT data) being smaller than the memory data word size. The stored DUT data can be partitioned by frames, which can include sectors that further partition the DUT data. In some embodiments, a first sample of the stored DUT data is partitioned by a frame. The last frame pointer can point to a second sample of the stored DUT data, which is partitioned by a different frame. Additionally, the first sample may be partitioned by a sector. The last sector pointer may point to a third sample of the stored DUT data, where the third sample is partitioned by a different sector.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 1 illustrates a format of a sample stored in a trace buffer, in accordance with at least one embodiment.

FIG. 2 shows partitioning within a trace buffer using the header format described in FIG. 1, according to at least one embodiment.

DETAILED DESCRIPTION

Figure 3:
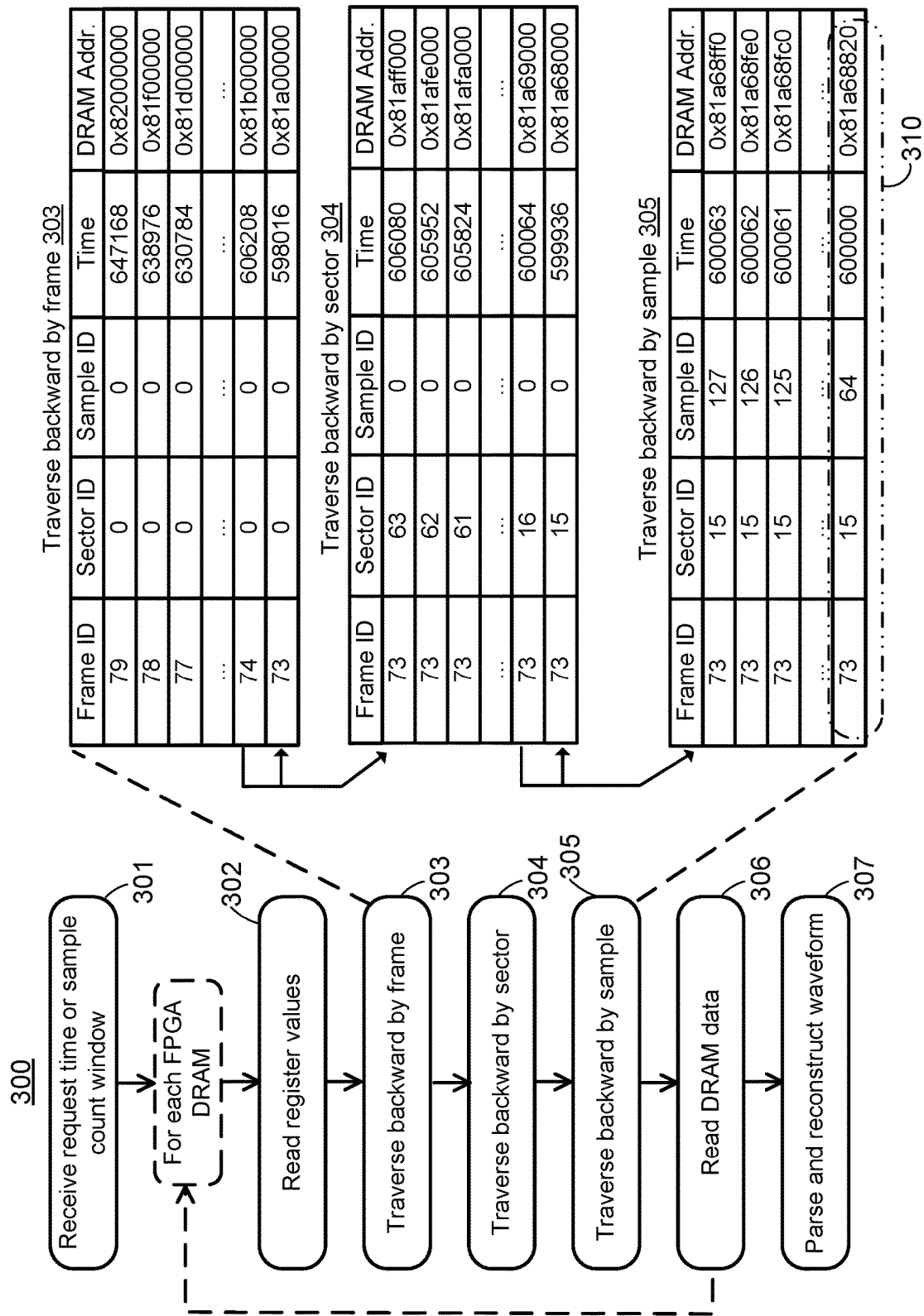
FIG. 3 shows a process flow for traversing memory to identify a user's requested sample, in accordance with at least one embodiment.

Aspects of the present disclosure relate to trace buffer data management. Emulation and prototyping sample and store device under test (DUT) signal activity data. One type of DUT signal is a DUT input signal and another type of DUT signal is an internal state signal. An emulation system operating in a continuous mode can capture and store DUT signal activities each signal cycle, creating a large amount of data for storage. An emulation system operating in a snapshot mode can capture and store DUT signal activities only at certain signal cycles to reduce the amount of data stored. For example, some internal state signals can be reconstructed with DUT input signals and thus, every internal state signal does not need to be captured and stored. An emulation system may use one or more sample clocks during snapshot mode to capture DUT signal activities only at certain signal cycles.

An emulation system can recognize each signal cycle as a sample. The emulation system can organize a certain number of samples as one sector. Additionally, the emulation system can organize a certain number of sectors as one frame. The emulation system can output the stored signal activity data according to a particular sample, sector, or frame. For example, the emulation system can traverse the sampled data according to a user's request for a particular sample. The user can program multiple sample clocks differently. For example, four sample clocks in firmware (FW) and each are individually configured based on edges of user clocks (e.g., rising or falling edges) and the clocks' granularity. A user can specify that the emulation system captures and stores DUT activity signals at each user clock edge for each of the four sample clocks. Thus, the amount of data can be very large. Furthermore, the data captured may be of varying length because a user can control the rate of sample. Thus, the data length of each stored data sample can be unpredictable. Because of the unpredictable sample length, conventional emulation systems do not make forward linked lists or forward pointers available.

Additionally, forward linked lists are not provided in conventional emulation systems because a first header may not be available for the beginning of a forward linked list. An emulation system can start at a first header of sampled data to traverse the sampled data using a forward linked list. However, the first header may not be available when the first header and the corresponding sampled data is overwritten (e.g., in a ring-buffer overwrite mode where the oldest data is overwritten first). Furthermore, finding a new "first header" is challenging to determine due to the unpredictable sample length described previously. Thus, conventional emulation systems may rely on a last header, corresponding to the latest captured and stored data, as a starting point when traversing sampled data. Conventional emulation systems traverse data one sample at a time from the latest sample's header. Because the emulation system may capture and store a large amount of DUT signal activity (e.g., on each clock edge), this traversal can be both processing intensive and time consuming.

Systems and methods are described herein for trace buffer data management that enables dynamic traversal through sampled data of varying lengths and thus, avoids the slow and processing intensive incremental traversing by which conventional emulation systems are limited. A trace buffer may be a buffer storing DUT activity signals traced during emulation. In particular, the trace buffer described herein implements a header format that allows for an emulation system (e.g., during runtime (RT)) to search from one sample to another independent of the sample length or the samples' locations in the trace buffer (e.g., not only back to back sample locations, one sample at a time). The header format can specify one or more of a frame, sector, or sample identifier of a previously sampled sample, which the emulation system can read to navigate to a particular sample based on a user specified sample characteristic (e.g., sample count or sample time). Thus, the trace buffer data management described herein decreases both processing resources used and time spent to read DUT trace buffers.

Referring now to FIG. 1, it illustrates a format of a sample stored in a trace buffer 100, in accordance with at least one embodiment. The trace buffer 100 includes a header having a format 110 and data having a format 120. The number of data packets depicted as stored within the trace buffer 100 in FIG. 1 is a non-limiting example, and a limited amount is depicted to promote clarity (e.g., there may be additional data packets stored within a trace buffer). The terms "sample" or "record" may be used interchangeably to refer to a header and a corresponding group of data packets. For example, one record is shown in the trace buffer 100. The number of records may be greater (e.g., as shown in the trace buffer example of FIG. 2). Although dynamic random access memory (DRAM) is referenced with respect to the storage and retrieval of DUT data sampled during emulation, the trace buffer formatting and management described herein may be implementing with any suitable memory.

A trace buffer may be organized into various partitions, and the various partitions may be organized according to a hierarchy. The organization may be implemented by the emulation system according to determined values (e.g., user specified values). For example, samples of a trace buffer may be organized by frames and sectors: one frame may be partitioned into sixty four sectors, and one sector may be partitioned into one hundred and twenty eight samples. Thus, data packets in samples can be stored using partitions such as frames and sectors.

The format 110 of the header of the trace buffer 100 stores values to indicate a time stamp 111 of the sample, a sample count 112 of the sample, a last sample pointer 113 of the trace buffer 100, a last sector pointer 114 of the trace buffer 100, and a last frame pointer 115 of the trace buffer 100. The time stamp 111 may indicate the time at which an emulation stored the sample in the trace buffer 100. The sample count 112 may indicate a numerical or an alphanumerical identifier for a sample. The sample count 112 may be a unique value within a sector, and the same value may be used within a different sector to identify a different sample within the different sector. The sample count assigned to a stored sample may be incremented for each sample stored. An example trace buffer with populated header values is shown in FIG. 3.

The last sample pointer 113 may indicate an address (e.g., a FW register address) at which the header of the sample stored prior (e.g., immediately prior) to the present sample associated with the pointer 113 is stored in memory. The term "latest stored" may be used to refer to a value of a group of values that is stored the most recently. The term "last stored" may be used to refer to a value of a group of values that is stored relatively prior to another value of the group (e.g., stored immediately prior to another value being stored, where the other value is not necessarily the latest stored). The last sample pointer may point to a sample within the same sector that was stored prior to the present sample.

The last sector pointer 114 may indicate an address of a sample stored in a sector prior to the present sector associated with the pointer 114. A prior sector may refer to a sector having samples stored earlier than a sample of a present sector. The last sector pointer 114 may point to the latest stored sample of the prior sector. In some embodiments, a last sector pointer may point to the earliest stored sample of the present sector (e.g., a last sample pointer 232 of FIG. 2).

A last frame pointer 115 may indicate an address of a sample stored in a frame prior to the present frame associated with the pointer 115. Similarly, a prior frame may refer to a frame having samples stored earlier than a sample of a present frame. In some embodiments, in response to a trace buffer having a single frame, the last frame pointer 115 may point to the earliest stored sample within the present frame. Similarly, in some embodiments, in response to a trace buffer having a single sector, the last sector pointer 114 may point to the earliest stored sample within the present sector. Additional description regarding the significance of the pointers and the values to which they point are described further in FIG. 3. Additionally, FIG. 2 shows an example of partitioning and the addresses to which a last sample pointer, a last sector pointer, and a last frame pointer may point.

An emulation system reads out data from the trace buffer 100. In some embodiments, the emulation system reads out data in a determined number of words (e.g., a predetermined sixteen words with each read). Each word includes a determined number of bits (e.g., thirty two bits per word). Both the header and the data stored in the trace buffer 100 may be aligned into the determined number of words, which may also be referred to as "a memory data word size." For example, the format 110 of header may include N values in each of the determined number of words, N. Alternatively, the format 110 may include less than N values and reserve the remaining words that are not being used to store header values (e.g., reserve by storing zeroes). Similarly, the format 120 of the data may include an amount of data that is a multiple of N or padding when storing an amount of data that is less than a multiple of N. For example, the trace buffer 100 includes four packets of data that occupy thirty six of forty eight words that are aligned for use in storing the four packets.

The determined number of words, N, may also determine a size of overwritten data (e.g., for data wraparounds in ring buffers). For example, if a fifth data packet having a size of sixteen words is stored in the trace buffer 100 and the trace buffer 100 is embodied as a ring buffer, four words will be stored at the start of the trace buffer 100 because twelve words fit within the sixteen determined number of words remaining after the portion 121 of the fourth packet.

In some embodiments, the emulation system may capture DUT data. The emulation system may receive a determined number for clock cycle intervals to sample internal state signals. The emulation system may receive DUT data that includes internal state signals and primary input signals. The emulation system can sample the primary input signals on each clock cycle and sample the internal state signals at the determined number of clock cycle intervals. The emulation system can create, on each clock cycle, a header for a current sample of the DUT data. The header may include a time stamp of a current sample, a sample count of the current sample, a last sample pointer, a last sector pointer, and a last frame pointer. The emulation system may store, with each clock cycle, the current header of the current sample of the DUT data with a time stamp. Additionally, the emulation system can store the internal state signal at each interval corresponding to the determined number of clock cycle intervals.

FIG. 2 shows partitioning within a trace buffer 200 using the header format described in FIG. 1, according to at least one embodiment. The trace buffer 200 includes sample 0.0 having a header 210, sample 63.0 having a header 220, and sample 63.127 having a header 230. Data values are depicted using the abstraction of "D" and header values are depicted using abstractions corresponding to the type of values stored in the header (e.g., "rsvd," "lfrm" etc.). A write pointer of the emulation system may point to the latest word stored in memory. As depicted, the write pointer points to the data row 240 having the latest stored word. The write pointer may be a register that records where the firmware write pointer location is. The trace buffer 200 demonstrates that each sample may have different lengths, which may also be referred to as sizes (e.g., depending on the sampling rates selected by the users and/or a number of clocks used to sample the DUT activity signals). Regardless of the varying sample sizes, the trace buffer header format enables a traversal of the samples and avoiding the processing intensive process taken by conventional emulation systems that step through each of the samples one at a time to find a desired sample.

The last frame, last sector, and last sample pointers of the header format enable traversal that can step through samples in a dynamic fashion (e.g., not limited to a fixed step size). The header 230 includes a last frame pointer 231 that points to the address of the frame having the earliest stored sample in the frame, which is the sample 0.0. In alternative embodiments where the trace buffer 200 includes more than one frame, the last frame pointer 231 may point to the earliest stored sample in a different frame (e.g., the immediate frame prior storing samples taken previously). The header 230 includes a last sector pointer 232 that points to the address of the earliest stored sample in a sector prior to the sector of the sample 63.127, which is the sector sixty three. Another example of the last sector pointer is shown using the last sector pointer 252 of the sample 1.0. The last sector pointer 252 points to the sector zero and the earliest stored sample, sample 0.0. The header 230 includes a last sample pointer 233 that points to the address of a sample stored prior to the sample 63.127 and within the same sector, which is the sample 63.126. Another example of a last sample pointer is shown using the last sample pointer 253 of the sample 0.1. The last sample pointer 253 points to the sample 0.0.

The numbering used for the samples in FIG. 2 also contains information about the sector and sample within a frame. For example, the sample 63.127 is named accordingly due to being partitioned in the sixty third sector and the one hundred and twenty seventh sample. In some embodiments, a frame may have sixty four sectors. Accordingly, sectors zero through sixty three of a frame may be included in the trace buffer 200 (a portion of the total number of samples of the trace buffer 200 may be depicted in the FIG. 2 to promote clarity). Similar, the naming of sample 63.126 may indicate that it is stored earlier than sample 63.127 by one sample. In some embodiments, a sector may have one hundred and twenty eight samples. Accordingly, a single sector (e.g., sector sixty three) may include samples zero through one hundred and twenty seven (e.g., sample 63.0 through sample 63.127).

When tracing back data during runtime, the emulation system can read the firmware register value of the write pointer to determine the latest stored sample's header location. The emulation system can then read the content in the header row (e.g., the header 230) to determine a sample stored prior to the current sample, a sample stored in a sector prior to the current sector, or a sample stored in a frame prior to the present frame.

FIG. 3 shows a process flow 300 for traversing memory to identify a user's requested sample, in accordance with at least one embodiment. The process flow 300 may be performed by an emulation system implementing the header format for trace buffers described herein. The process flow 300 may include additional, fewer, or alternative operations than shown in FIG. 3. For example, the loop of process 300 may be performed using multi-threading for parallel processing. Additionally, FIG. 3 shows example values of headers corresponding to sampled data within trace buffers.

An emulation system may receive 301 a user's request for a particular sample of a DUT activity signal captured during emulation of a DUT. The user's request may indicate a time stamp, sample count, range (window) thereof (e.g., a range of sample counts from a start count to an end count), or a combination thereof. For example, the user's request indicates a requested sample time stamp of 600000 microseconds (μs). That is, the user is requesting the sample 310 partitioned within frame seventy three and sector fifteen, and having sample identifier sixty four. Although the headers shown in FIG. 3 do not depict a sample count, a header may include a sample count that uniquely identifies a sample.

The emulation system may read and traverse registers of one or more FPGA DRAM to identify sample(s) satisfying the user's request. The emulation system may read 302 register values. For example, the emulation system reads 302 firmware register values of a DRAM's latest written sample's header (e.g., last sample pointer, last sector pointer, last frame pointer, etc.) beginning at a location where the write pointer indicates (i.e., the latest written sample of a particular DRAM). The emulation system may begin by reading the header information of a sample at address 0x82000000 that is partitioned in frame seventy nine and sector zero. The emulation system may determine that the time stamp, 647168 μs, is subsequent to the user's requested time stamp of 600000 μs. In response, the emulation system traverses 303 backward by frame. For example, the emulation system reads the address stored in the last frame pointer within the sample at address 0x82000000, which points to the sample stored at address 0x81f00000. This address may correspond to the earliest stored sample within frame seventy eight. By storing the address of the earliest stored sample of another frame within the last frame pointer, the emulation system enables a comparison between the earliest time stamp of a sample within the other frame against the user's requested time stamp. If the user's requested time stamp is less than the earliest time stamp, the emulation system may continue to traverse 303 backward by frame, continuing to compare other frames' earliest time stamps to the user's requested time stamp, until the emulation system determines that the user's requested time stamp is greater than another frame's earliest time stamp. The emulation system may then determine to focus on that frame, as the user's requested sample is likely within that frame. As shown in FIG. 3, the time stamp of frame seventy four, 606208 μs, is greater than the user's requested time stamp of 600000 μs. However, the time stamp of frame seventy three, 498016 μs, is less than the user's requested time stamp. Thus, the emulation system proceeds to traverse 304 backward by sector within frame seventy three. The emulation system may follow the last sector pointer within the header of the sample at the address 0x81a00000, which may point to the sample at the address 0x81aff000. The last sector pointer may point to the sector having the latest sample within frame seventy three, which is sector sixty three.

The emulation system similarly traverses 304 backward by sector within a frame, comparing a sample count or time stamp of a user's request to the sample count or time stamp located within a header of a traversed sample. For example, in response to determining that the user's requested time stamp is less than the time stamp of the header being read (i.e., collected earlier), the emulation system may continue to traverse 304 backward according to the last sector pointer. The last sector pointer may point to an earliest sample within another sector (e.g., the last sector pointer in the sample of address 0x81a69000 of sector sixteen points to the earliest sample in sector fifteen). In response to determining that the user's requested time stamp is greater than the time stamp of the header being read (i.e., collected later), the emulation system may begin to traverse 305 backward by sample. The emulation system may follow the last sample pointer within the header of the sample at the address 0x81a68000, which may point to the sample at the address 0x81a68ff0. The last sample pointer may point to the latest sample collected within sector fifteen and frame seventy three, which is sample one hundred and twenty seven.

The emulation system similarly traverses 305 backward by sample within a sector, comparing a sample count or time stamp of a user's request to the sample count or time stamp located within a header of a traversed sample. The emulation system may continue to traverse samples from latest stored to earliest stored within the sector until the emulation system reaches the sample having the user's requested time stamp, which is the sample 310. The emulation system reads 306 the DRAM data in the sample 310 to determine that the time stamp in the sample 310 matches the user's requested time stamp. Alternatively, in response to not finding the user's requested time stamp or sample count within the traversed FPGA DRAM, the emulation system may traverse another FPGA DRAM and repeat operations 302-306 until the user's requested sample is found. The emulation system may return a notification that the sample was not found in response to determining that none of the FPGA DRAMs traversed do not have a sample characterized by the user's requested time stamp or sample count. The emulation system may parse and reconstruct 307 a waveform according to the requested sample that was read 306 from DRAM or in response to the user's request including a window, parse and reconstruct 307 waveforms with multiple requested samples within the user specified window.

In some embodiments, the emulation system may read data captured from a DUT in an emulator by receiving a request for a read of at least a portion of DUT data. The request may include a specified time stamp (e.g., a user-specified time stamp). The emulation system may read from a register of an address of a latest stored sample (e.g., a last sample in a last sector that is further partitioned in a last frame). The emulation system may read a header from a memory location identified by the address, where the header includes a last frame pointer to an address of a sample partitioned by another frame, which may be referred to as a "previous frame header address." The emulation system may compare, for a first set of samples identified using the previous frame header address, the specified time stamp with a time stamp of each of the first set of samples until a compared time stamp of a sample of the first set of samples is earlier than the specified time stamp. In some embodiments, a first time stamp that is smaller in value than a second time stamp may be considered earlier than the second time stamp. A header of the sample of the first set of samples may have a last sector pointer to an address of a sample partitioned by another sector, which may be referred to as a "previous sector header address." The emulation system may compare, for a second set of samples identified using the previous sector header address, the specified time stamp with a time stamp of each of the set plurality of samples until a compared time stamp of a sample of the second set of samples is earlier than the specified time stamp. A header of the sample of the second set of samples may have a last sample pointer to an address of a previous sample, which may be referred to as a "previous sample header address." The term "previous sample" may refer to a sample that is stored prior to, or earlier than, another sample (e.g., a sample stored prior to a sample indicated by the write pointer). The emulation system may compare, for a third set of samples identified using the previous sample header address, the specified time stamp with a time stamp of each of the third set of samples until a compared time stamp of a sample of the third set of samples is equivalent to the specified time stamp. The emulation system can read the portion of the DUT data from the sample of the third set of samples.

Proccesses may be used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea with information supplied by a designer, information which is transformed to create an article of manufacture that uses a set of EDA processes. When the design is finalized, the design is taped-out, which is when artwork (e.g., geometric patterns) for the integrated circuit is sent to a fabrication facility to manufacture the mask set, which is then used to manufacture the integrated circuit. After tape-out, a semiconductor die is fabricated and packaging and assembly processes are performed to produce the finished integrated circuit.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). The processes described may be enabled by EDA products (or EDA systems).

During system design, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification, the netlist is checked for compliance with timing constraints and for correspondence with the HDL code. During design planning, an overall floor plan for the integrated circuit is constructed and analyzed for timing and top-level routing.

During layout or physical implementation, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction, the circuit function is verified at the layout level, which permits refinement of the layout design. During physical verification, the layout design is checked to ensure that manufacturing constraints are correct, such as DRC constraints, electrical constraints, lithographic constraints, and that circuitry function matches the HDL design specification. During resolution enhancement, the geometry of the layout is transformed to improve how the circuit design is manufactured.

During tape-out, data is created to be used (after lithographic enhancements are applied if appropriate) for production of lithography masks. During mask data preparation, the 'tape-out' data is used to produce lithography masks that are used to produce finished integrated circuits.

A storage subsystem of a computer system (such as computer system 500 of FIG. 5, or host system 407 of FIG. 4) may be used to store the programs and data structures that are used by some or all of the EDA products described herein, and products used for development of cells for the library and for physical and logical design that use the library.

Figure 4:
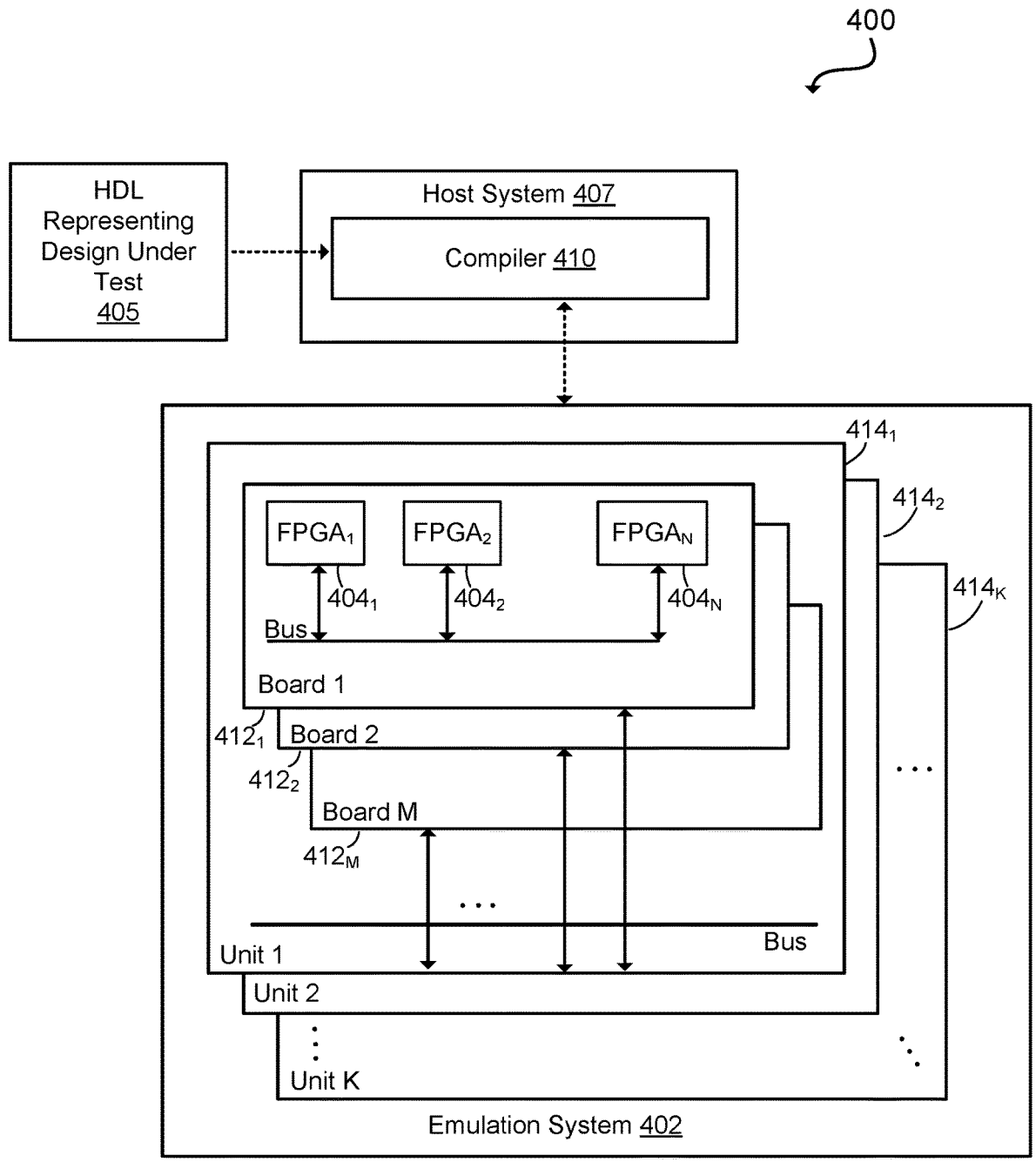
FIG. 4 depicts a diagram of an example emulation system in accordance with some embodiments of the present disclosure.

FIG. 4 depicts a diagram of an example emulation environment 400. An emulation environment 400 may be configured to verify the functionality of the circuit design. The emulation environment 400 may include a host system 407 (e.g., a computer that is part of an EDA system) and an emulation system 402 (e.g., a set of programmable devices such as Field Programmable Gate Arrays (FPGAs) or processors). The host system generates data and information by using a compiler 410 to structure the emulation system to emulate a circuit design. A circuit design to be emulated is also referred to as a Design Under Test ('DUT') where data and information from the emulation are used to verify the functionality of the DUT.

The host system 407 may include one or more processors. In the embodiment where the host system includes multiple processors, the functions described herein as being performed by the host system can be distributed among the multiple processors. The host system 407 may include a compiler 410 to transform specifications written in a description language that represents a DUT and to produce data (e.g., binary data) and information that is used to structure the emulation system 402 to emulate the DUT. The compiler 410 can transform, change, restructure, add new functions to, and/or control the timing of the DUT.

The host system 407 and emulation system 402 exchange data and information using signals carried by an emulation connection. The connection can be, but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 402.11. The host system 407 and emulation system 402 can exchange data and information through a third device such as a network server.

The emulation system 402 includes multiple FPGAs (or other modules) such as FPGAs 404₁ and 404₂ as well as additional FPGAs to 404_N. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 402 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $404_1$-$804_N$ may be placed onto one or more boards $412_1$ and $412_2$ as well as additional boards through $412_M$. Multiple boards can be placed into an emulation unit $414_1$. The boards within an emulation unit can be connected using the backplane of the emulation unit or any other types of connections. In addition, multiple emulation units (e.g., $414_1$ and $414_2$ through $414_K$) can be connected to each other by cables or any other means to form a multi-emulation unit system.

For a DUT that is to be emulated, the host system 407 transmits one or more bit files to the emulation system 402. The bit files may specify a description of the DUT and may further specify partitions of the DUT created by the host system 407 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 407 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate level netlist using the DUT description. A host system can use the netlist of the DUT to partition the DUT into multiple partitions where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT which include interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In case of multiple re-emulations of an FPGA, merging the results produces a full debug view.

The host system receives, from the emulation system, signals traced by logic of the identified FPGAs during the re-emulation of the component. The host system stores the signals received from the emulator. The signals traced during the re-emulation can have a higher sampling rate than the sampling rate during the initial emulation. For example, in the initial emulation a traced signal can include a saved state of the component every X milliseconds. However, in the re-emulation the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterwards, the circuit designer can request to re-emulate the same component for a different time period or to re-emulate another component.

A host system 407 and/or the compiler 410 may include sub-systems such as, but not limited to, a design synthesizer sub-system, a mapping sub-system, a run time sub-system, a results sub-system, a debug sub-system, a waveform sub-system, and a storage sub-system. The sub-systems can be structured and enabled as individual or multiple modules or two or more may be structured as a module. Together these sub-systems structure the emulator and monitor the emulation results.

The design synthesizer sub-system transforms the HDL that is representing a DUT 405 into gate level logic. For a DUT that is to be emulated, the design synthesizer sub-system receives a description of the DUT. If the description of the DUT is fully or partially in HDL (e.g., RTL or other level of representation), the design synthesizer sub-system synthesizes the HDL of the DUT to create a gate-level netlist with a description of the DUT in terms of gate level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that are associated with the time period.

The debug sub-system transmits the retrieved interface signals to the emulator. The debug sub-system instructs the debug sub-system to use the identified FPGAs and for the trace and injection logic of each identified FPGA to inject its respective traced signals into logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to collectively use all the cycles.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 5:
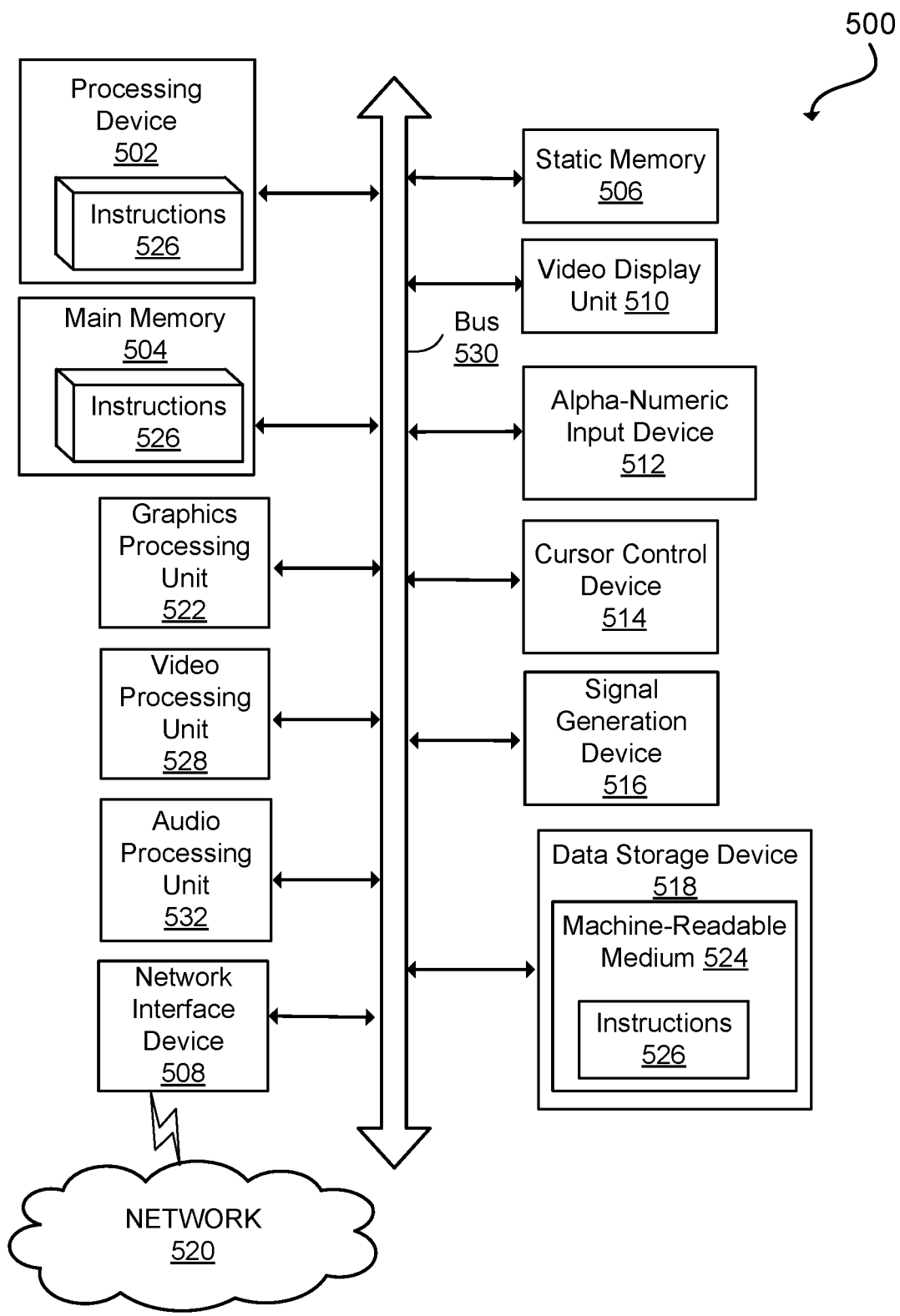
FIG. 5 depicts a diagram of an example computer system in which embodiments of the present disclosure may operate.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 may be configured to execute instructions 526 for performing the operations and steps described herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a non-transitory computer-readable medium) on which is stored one or more sets of instructions 526 or software embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media.

In some implementations, the instructions 526 include instructions to implement functionality corresponding to the present disclosure. While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 502 to perform any one or more of the methodologies of the present disclosure. The term "machine-readable storage medium" shall accordingly be taken to include, but not be limited to, solid-state memories, optical media, and magnetic media.

ADDITIONAL CONFIGURATION CONSIDERATIONS

Example benefits and advantages of the disclosed configurations include reducing processing resources required to traverse a trace buffer storing for emulation systems. For example, a 3 U design has 288 DRAM in total, where each DRAM has one million (M) samples stored. Further, each sector has 128 samples and each frame has 64 sectors in the DRAM trace buffer. A conventional emulation system that traverses sample by sample, assuming DRAM read speed is 10 megabytes per second (MB/s), would have a worst-case traverse time of approximately 1843 seconds. By contrast, an emulation system that applies the header format described herein for traversing a trace buffer can improve the same traverse time to approximately 0.2 seconds due to the decreased number of processing steps required to identify a desired sample.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A system comprising:
   a memory storing instructions; and
   a processor, coupled with the memory and to execute the instructions, the instructions when executed cause the processor to:
   receive a request for a read of at least a portion of DUT data, the request including a specified time stamp, wherein the DUT data is partitioned by a plurality of frames and wherein each of the plurality of frames comprises a plurality of sectors that further partition the DUT data;
   read a header of a latest sample of the DUT data, the header having a previous frame header address;
   compare, for a first plurality of samples identified using the previous frame header address, the specified time stamp with a time stamp of each of the first plurality of samples until a compared time stamp of a sample of the first plurality of samples is earlier than the specified time stamp, a header of the sample of the first plurality of samples having a previous sector header address;
   compare, for a second plurality of samples identified using the previous sector header address, the specified time stamp with a time stamp of each of the second plurality of samples until a compared time stamp of a sample of the second plurality of samples is earlier than the specified time stamp, a header of the sample of the second plurality of samples having a previous sample header address;

compare, for a third plurality of samples identified using the previous sample header address, the specified time stamp with a time stamp of each of the third plurality of samples until a compared time stamp of a sample of the third plurality of samples is equivalent to the specified time stamp; and read the portion of the DUT data from the sample of the third plurality of samples.

2. The system of claim 1, wherein the latest sample of the DUT data is partitioned by a first frame, and wherein the previous frame header address corresponds to a first particular sample of the DUT data partitioned by a second frame different from the first frame.

3. The system of claim 2, wherein the first particular sample of the DUT data is partitioned by a first sector, and wherein the previous sector header address corresponds to a second particular sample of the DUT data partitioned by a second sector different from the first sector.

4. The system of claim 1, wherein the instructions, when executed by the processor, further cause the processor to:

identify the first plurality of samples by traversing a plurality of addresses corresponding to the first plurality of samples starting from the previous frame header address.

5. The system of claim 1, wherein the instructions, when executed by the processor, further cause the processor to:

identify the second plurality of samples by traversing a plurality of addresses corresponding to the second plurality of samples starting from the previous sector header address.

6. The system of claim 1, wherein the DUT data includes multiple samples, and wherein each sample of the DUT data comprises a corresponding header and one or more corresponding data packets, where each corresponding header includes a previous frame header address, a previous sector header address, and a previous sample header address.

7. The system of claim 1, wherein each frame of the plurality of frames includes a determined number of sectors.

8. The system of claim 1, wherein the instructions, when executed by the processor, further cause the processor to:

reconstruct a waveform using the read portion of the DUT data from the sample of the third plurality of samples.

9. A non-transitory computer readable medium comprising stored instructions, which when executed by a processor, cause the processor to:

receive a request for a read of at least a portion of DUT data, wherein the request includes a requested time stamp or a requested sample count, wherein data packets of the DUT data are stored in one or more partitions of a memory, wherein the DUT data is partitioned by a plurality of frames and wherein each of the plurality of frames comprises a plurality of sectors that further partition the DUT data, and wherein a header associated with a data packet indicates a corresponding partition used to store the data packet;

read a first header associated with a first data packet of a latest sample of the DUT data, the first header including an identifier of a partition associated with a previous sample of the DUT data;

identify, using the partition, a second header associated with a second data packet of the previous sample, wherein the second header includes a time stamp of the previous sample and a sample count of the previous sample;

compare one of the requested time stamp and the time stamp of the previous sample or the requested sample count with the sample count of the previous sample; and read at least a data packet corresponding to the previous sample.

10. The non-transitory computer readable medium of claim 9, wherein the latest sample of the DUT data is partitioned by a first frame, and wherein the previous sample of the DUT data is partitioned by a second frame different from the first frame.

11. The non-transitory computer readable medium of claim 9, wherein the latest sample of the DUT data is partitioned by a first sector, and wherein the previous sample of the DUT data is partitioned by a second sector different from the first sector.

12. The non-transitory computer readable medium of claim 9, wherein each frame of the plurality of frames includes a determined number of sectors.

13. A non-transitory computer readable medium comprising stored instructions, which when executed by a processor, cause the processor to:

receive a determined number of clock cycle intervals to sample internal state signals;

receive DUT data comprising the internal state signals and primary input signals;

sample the primary input signals on each clock cycle and the internal state signals on every determined number of clock cycles;

create, on each clock cycle, a header for a current sample of the DUT data, the header comprising a time stamp of the current sample, a sample count of the current sample, a last sample pointer, a last sector pointer, and a last frame pointer;

store, with each clock cycle, the header of the current sample of the DUT data with the time stamp; and store the samples of internal state signals at each interval corresponding to the determined number of clock cycle intervals.

14. The non-transitory computer readable medium of claim 13, wherein the stored instructions, when executed by the processor, further cause the processor to:

store a portion of the DUT data in a memory; and align the stored portion of the DUT data with a memory data word size.

15. The non-transitory computer readable medium of claim 14, wherein the stored instructions, when executed by the processor, further cause the processor to:

pad the portion of the DUT data stored in response to a data or a header size being smaller than the memory data word size.

16. The non-transitory computer readable medium of claim 13, wherein the DUT data is partitioned by a plurality of frames and wherein each of the plurality of frames comprises a plurality of sectors that further partition the DUT data.

17. The non-transitory computer readable medium of claim 16, wherein a first sample of the DUT data is partitioned by a first frame, and wherein one of the last frame pointers points to a second sample of the DUT data partitioned by a second frame different from the first frame.

18. The non-transitory computer readable medium of claim 17, wherein the first sample is partitioned by a first sector, and wherein the last sector pointer points to a third sample of the DUT data partitioned by a second sector different from the first sector.

* * * * *